Jan 6, 1931.  C. B. SINGLETON  1,787,842
ROTARY PLOW
Filed June 12, 1929   2 Sheets-Sheet 1
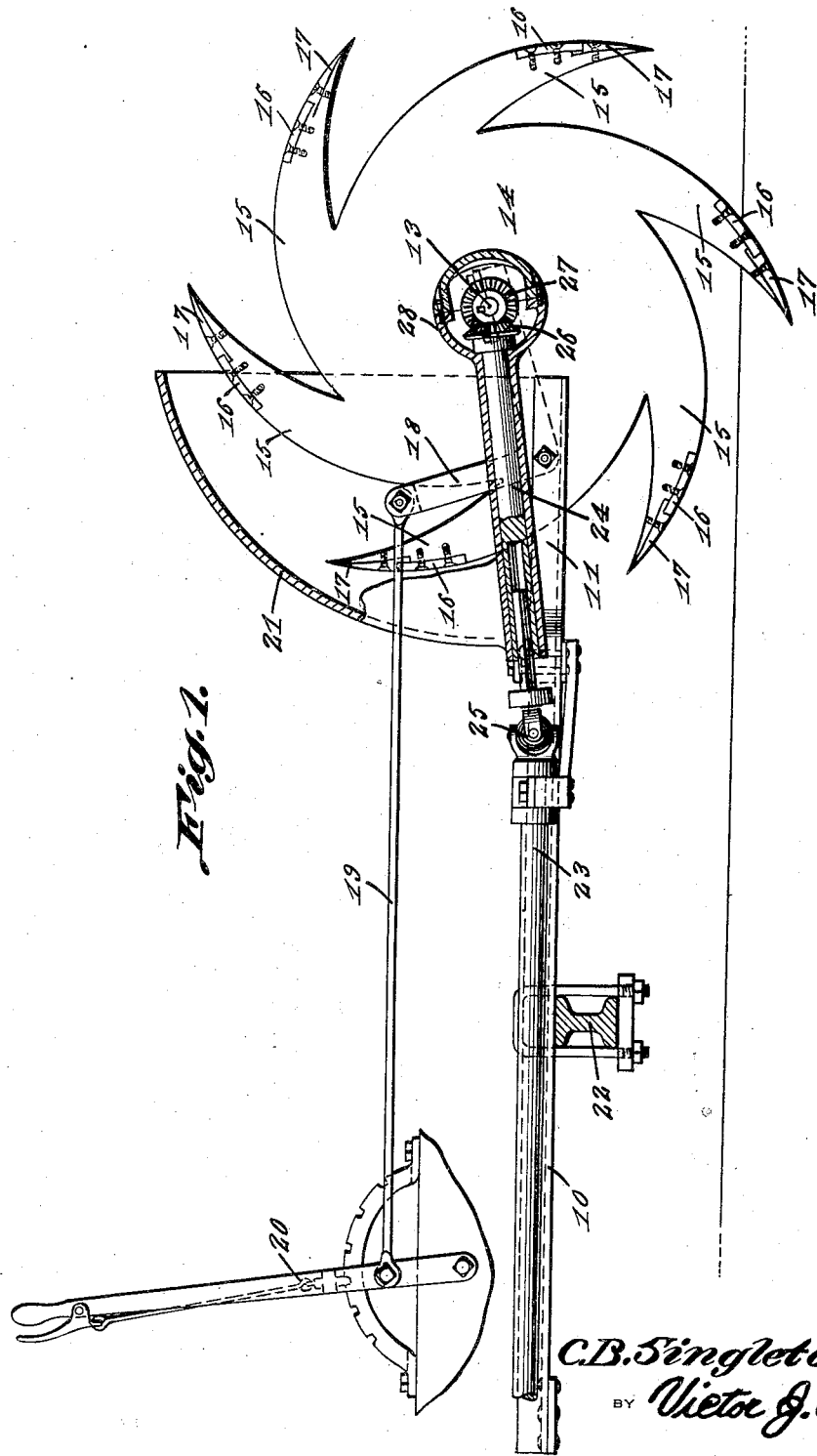

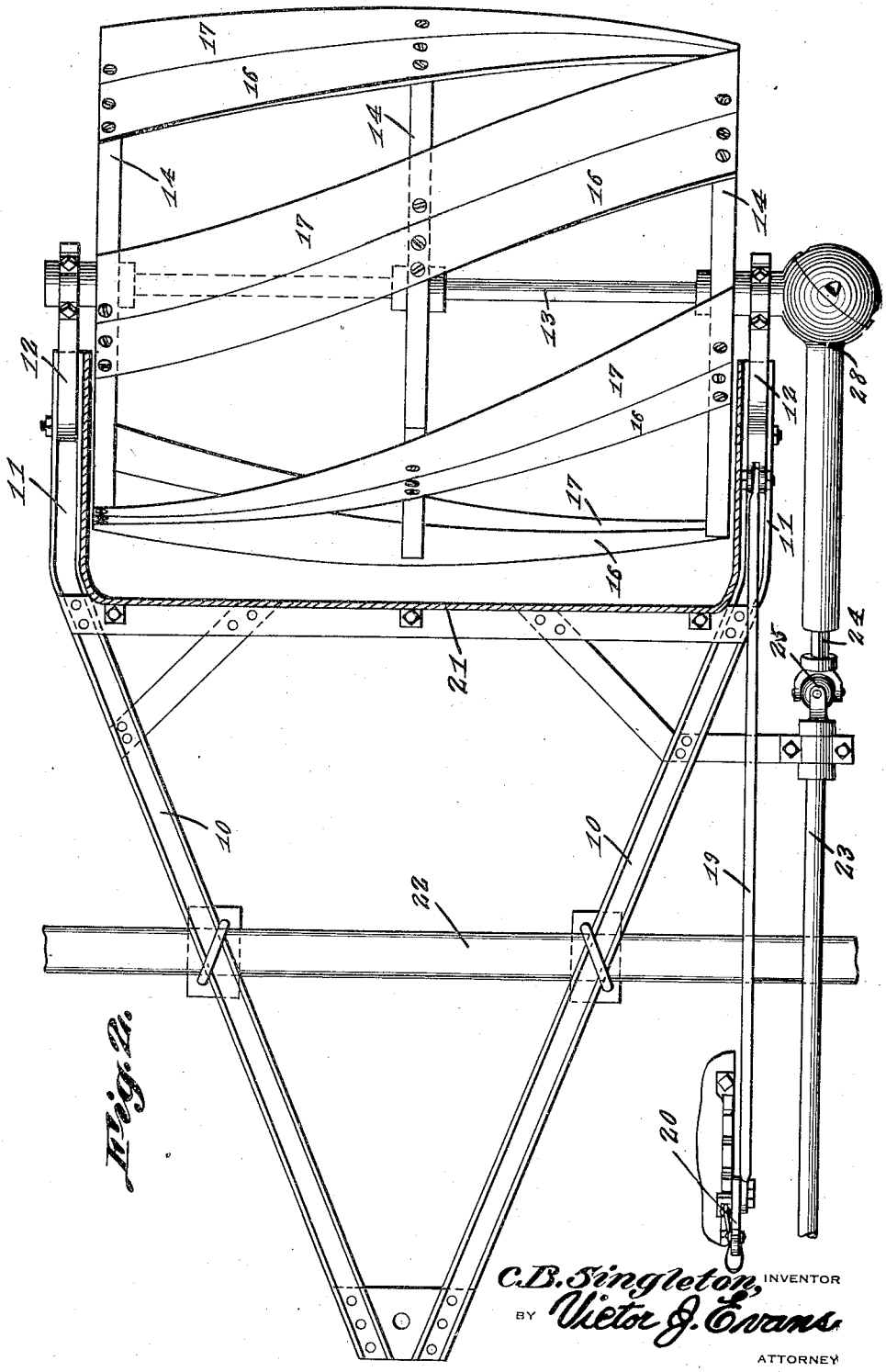

Patented Jan. 6, 1931

1,787,842

UNITED STATES PATENT OFFICE

CHARLES B. SINGLETON, OF LA GRANGE, FLORIDA, ASSIGNOR OF ONE-THIRD TO BYRON A. BEAL, OF NEW YORK, N. Y., AND ONE-THIRD TO THOMAS A. CONWAY, OF TITUSVILLE, FLORIDA

ROTARY PLOW

Application filed June 12, 1929. Serial No. 370,365.

The present invention contemplates the provision of a rotary plow which is simple in construction, and very efficient for the purpose intended, the invention residing in the construction, combination and arrangement of parts hereinafter claimed.

In the drawings forming part of this application like numerals of reference indicate similar parts in the several views, and wherein:—

Figure 1 is a side elevation partly in section illustrating the invention.

Figure 2 is a top plan view.

Referring to the drawings in detail, 10 represents the side members of a substantially V-shape frame terminating to provide straight parallel portions 11 upon which are pivotally mounted a pair of bracket arms 12 in which the axle 13 is mounted.

The plow proper preferably consists of a plurality of spaced disks 14 which are mounted on the axle 13, and each disk is formed to provide a circumferential series of curved fingers 15 as clearly illustrated in Figure 1. Any number of such disks may be used in a single plow construction, while each disk may vary in the number of fingers formed thereon, depending of course upon the character of work to be performed. Each finger 15 assists in supporting a cutting blade 16, and the corresponding fingers of the respective disks are slightly offset so that the particular blade connecting the same is arranged approximately at an angle of 30°. It will also be noted upon inspection of Figure 1 that the cutting edge of each blade is indicated at 17 and separate from the blade itself so that it can be conveniently removed for sharpening as the occasion may require.

It will be further noted that each finger is slightly reduced so that the cutting blades lie on the same plane therewith, while the cutting edge of each terminates slightly in advance of the extremity of the particular finger with which it is associated. One of the bracket arms 12 which support the axle 13 is formed with an angular extension 18 which is connected with one end of a rod 19, the other end of which is connected with a lever 20 through the instrumentality of which the plow in its entirely can be raised or lowered with relation to the ground. Also supported upon the frame in advance of the plow is a suitable fender or guard 21.

It is of course to be understood that the plow can be rotated by any suitable means, but I have herein shown the plow used in conjunction with a tractor, the axle of which is indicated at 22. The side members 10 of the frame are supported by the axle 22 as illustrated in Figure 2 while the plow is rotated from a transmission drive shaft including the sections 23 and 24 which are connected by a universal joint 25. The section 24 is provided with a bevel gear 26 which meshes with a similar gear 27 carried by the adjacent end of the axle 13, while these gears and drive shaft are arranged in a suitable housing 28. As above stated the plow can be quickly and conveniently raised or lowered with relation to the ground, and will revolve about six hundred revolutions per minute. The speed however, can be varied as the occasion requires by shifting the gears of the tractor.

While it is believed that from the foregoing description the nature and advantages of the invention will be readily understood, I desire to have it known that I do not limit myself to what is herein shown and described and that such changes may be resorted to when desired as fall within the scope of what is claimed.

What I claim is:

A rotary cutting tool comprising an axle, spaced disks mounted thereon, each disk including a circumferential series of curved fingers terminating in pointed extremities, a shoulder formed on each finger rearwardly of the said extremity, cutting blades connecting the corresponding fingers of the respective disks and curved to conform to the curvature of said fingers, each blade contacting the shoulders of said corresponding fingers and lying substantially flush with the outer surface thereof, and the cutting edge of each blade projecting a slight distance beyond the free extremities of said fingers.

In testimony whereof I affix my signature.

CHARLES B. SINGLETON.